United States Patent [19]

Lindert

[11] Patent Number: 4,532,309

[45] Date of Patent: Jul. 30, 1985

[54] WATER-BASED EPOXY RESINS STABLE TO HYDROLYSIS

[75] Inventor: Andreas Lindert, Troy, Mich.

[73] Assignee: Parker Chemical Company, Madison Heights, Mich.

[21] Appl. No.: 210,878

[22] Filed: Nov. 28, 1980

[51] Int. Cl.$^3$ .................... C08F 283/10; C08L 63/10
[52] U.S. Cl. .................................. 525/488; 525/529; 525/530; 525/531; 525/532
[58] Field of Search ............... 525/488, 529, 530, 531, 525/532

[56] References Cited

U.S. PATENT DOCUMENTS

| 3,637,618 | 1/1972 | May | 525/531 |
| 3,670,047 | 6/1972 | Broecker | 525/530 |
| 3,932,556 | 1/1976 | Takamori et al. | 525/531 |

FOREIGN PATENT DOCUMENTS 1203474 10/1961 Fed. Rep. of Germany ...... 525/531

Primary Examiner—John C. Bleutge
Assistant Examiner—Robert E. L. Sellers, II
Attorney, Agent, or Firm—Arthur E. Kluegal

[57] ABSTRACT

A stable water soluble epoxy resin suitable for use as a coating material is made by grafting an acid functional vinyl monomer onto unsaturated functional sites on an epoxy resin backbone.

31 Claims, No Drawings

WATER-BASED EPOXY RESINS STABLE TO HYDROLYSIS

BACKGROUND OF THE INVENTION

The present invention relates to water soluble or dispersible epoxy resins which are useful for surface coatings, particularly on metal surfaces such as steel, galvanized steel, and aluminum.

Epoxy resins generally have good adhesion and chemical resistance characteristics and are well known for use as protective coatings on metal surfaces. Unfortunately, although it would be advantageous to have water-soluble epoxy resins for use as surface coatings, most epoxy resins are insoluble in water and hence, are applied either as 100 percent solids or by means of an organic solvent. Epoxy resins can be modified to be water-soluble or dispersible but such modification can result in certain disadvantages.

For example, epoxy resins can be emulsified in water using emulsifying agents and applied as coatings. However, use of emulsifiers increases the sensitivity of the coatings to chemical and humidity attack. Alternatively, an epoxy ester can be made from an epoxy resin. The epoxy ester can then be made water dispersible or water soluble by reacting the ester with a base. For example, an epoxy resin can be reacted with a fatty acid or an organic acid, the reaction product of which can then be reacted with an anhydride such as maleic anhydride, phthalic anhydride, succinic anhydride, trimellitic anhydride, or the like to generate carboxylic acid functionality and water dispersibility. Unfortunately, the product is sensitive to ester hydrolysis and precipitates upon storage in water.

It is an object of the present invention to provide a process for providing a water soluble or dispersible epoxy resin suitable for use in coating compositions. Another object of the present invention is to provide an epoxy resin which is water soluble or dispersible but has good stability. Still another object of the present invention is to provide an epoxy resin which can be applied as a coating which has good coating characteristics with regard to resistance to attack by chemicals and humidity. These and other objects of the present invention will be apparent from the following disclosure. All parts and percentages herein are by weight unless otherwise indicated.

SUMMARY OF THE INVENTION

An epoxy resin which is water soluble or dispersible and is suitable for use in a coating composition is provided by providing an epoxy resin backbone with organic unsaturated functional sites, grafting an acid functional vinyl monomer onto the backbone in a free radical initiated chain reaction, and the neutralizing the carboxylic acid functional groups on the vinyl monomer. The final product is a polyhydric phenol or polyether alcohol which is readily dispersible or soluble in water and is stable therein.

DESCRIPTION OF THE INVENTION

In accordance with the present invention, a modified epoxy resin is synthesized in a two step process. First, a low molecular weight epoxy resin is upstaged in a reaction with a multifunctional monomer having a functional moiety capable of reacting with the oxirane moiety of the epoxy resin and at least one functional moiety comprising an organic unsaturated site capable of subsequent free radical reaction with a vinyl monomer. The reaction product of the first step is an epoxy resin backbone having organic unsaturated functional sites. Second, the reaction product of step 1 is reacted with an acid functional vinyl monomer in a free radical initiated reaction. In this second step a sufficient amount of vinyl monomer is grafted onto the epoxy backbone of step 1 to provide carboxylic acid functionality and water solubility or dispersibility to the modified epoxy resin product when neutralized with a suitable base. The final product is stable in water and an aqueous composition comprising the modified epoxy resin is suitable for use in a coating composition.

The reaction of step 1 is carried out at high temperatures under conventional conditions for epoxy upstaging reactions. Suitable lower molecular weight epoxy resin starting materials include epoxy resins conventionally used in epoxy upstaging reactions and include aliphatic diepoxide such as 1, 4-bis (2, 3 epoxypropoxy) butane; 4 (1, 2-epoxyethyl) 1, 2-epoxycyclohexane; and many similar aliphatic epoxy compounds. Aromatic diepoxides are also suitable for use in the first step of the present invention and are preferred for use herein. The glycidyl ether of 4,4-sec-butylidenediphenol or 4,4' isopropylidenediphenol are especially preferred for use herein as are commercially available pre-catalyzed epoxy resins such as epon 829 from Shell Chemical Company or DER 333 from Dow Chemical Corporation.

A variety of multi-functional monomers can be employed in the first step of the present invention to react with the lower molecular weight epoxy compounds. Useful multi-functional monomers are those containing an unsaturated double bond, i.e. an olefin moiety, and a reactive site which will react with the oxirane moiety of the epoxy compound. Of course, it will be appreciated that grafting of step 2 can take place by addition to the olefin moiety itself or, by hydrogen extraction, at a carbon atom adjacent thereto. Suitable multi-functional monomers include; 2,2-bis (4-hydroxy-3 allylphenyl) propane; epoxidized butadienes; and mono, di and tri methylol derivatives of 0-allylphenol or similar methylol derivatives of allylphenols.

Optionally, diphenols, such as Bisphenol A or isopropylidenediphenol can be co-reacted with the lower molecular weight epoxy compound and the multifunctional monomer. A higher molecular weight epoxy resin containing the unsaturated organic group is obtained by the resulting fusion reaction.

When reacting Epon 829 or DER 333 with the multifunctional monomer component and optionally isopropylidenediphenol, the reaction mixture can be calculated on a theoretical basis in such proportions that the polymer end groups are oxirane groups, mixtures of oxirane and phenolic end groups or the reaction components can be adjusted to yield phenolic end group components predominantly. It is however, preferable to avoid phenolic end groups to prevent interference with the reaction of step 2. In an alternate procedure, a monofunctional phenol or oxirane containing components can be added to the reaction of Epon 829, multifunctional monomer, and optionally isopropylidenediphenol, to partially or completely terminate the epoxy polymer resin chain. Useful monofunctional phenols or oxirane containing component include: alkylated (methyl, ethyl, propyl, butyl, nonyl, dodecyl, etc.) phenols, ortho and para phenyl phenol, phenyl o-cresol, cymel phenol, alkoxy—2, 3 epoxypropane—such as, for example, epoxide 7 and 8 produced by the Procter & Gamble Company, butyl glycidyl ether, phenyl glycidyl ether, xylenol, phenol, cresol, naphthol, glycidyl ether of cumylphenol, cresyl alycidyl ether, cordura E, and $C_{12}$—$C_{20}$ olefin oxides.

Preferably, terminating groups which also contain an unsaturated site which can be used in step two of the present invention as a grafting site are employed in the first step of the present invention. Examples of such compounds include: phenols derivated from cashew nut liquids, as well as the glycidyl ethers of such phenols such as the commercially available compounds, cardolite NC-700 and NC-513 of the 3M Company, allyl glycidyl ether, 2-allyl phenol, and eugenol. These compounds when located on the epoxy resin provide additional sites for free radical grafting, although by themselves give unstable emulsions when used to make higher molecular weight epoxy resins.

In the second step of the present invention the modified epoxy resin provided in step 1 is reacted with an acid functional vinyl monomer in the presence of a free radical initiator to graft the vinyl monomer onto the backbone on the modified epoxy resin by addition to the olefin moiety itself or to a carbon atom adjacent thereto by hydrogen extraction. Thus, a vinyl monomer containing one or more carboxylic acid groups is grafted onto the modified epoxy resin during the radical polymerization process.

A broad range of acid functional vinyl monomers are suitable for use in step 2 of the present reaction. Examples of suitable acid functional vinyl monomers include itaconic acid, fumaric acid, acrylic acid, methacrylic acid, and maleic acid. The acid functional vinyl monomes can be used alone or copolymerized in step 2 of this invention. Furthermore, other vinyl monomers can be copolymerized with the acid functional vinyl monomer or monomers durin the radical grafting step. Examples of such additional vinyl monomers include alkyl acrylates or methacrylates, such as methyl methacrylate or butyl acrylate, as well as styrene, vinyl toluene, vinyl pyridine, acrylamide vinyl and vinylidene chloride, vinyl ether, hydroxy ether or propyl acrylate and the like.

The exact amount of carboxylic acid functionality required to be grafted onto the epoxy resin backbone to provide an epoxy resin which, when neutralized, is water soluble or dispersible is dependent upon many factors such as the amount of co-solvents used, temperature of reaction, amount of initiator used, and the exact type of epoxy resin reactant and its molecular weight. In general, under the reaction conditions used, a sufficient amount of acid functional vinyl monomer must be used to obtain an actual acid number in the grafted epoxy polymer of at least about 15 for water stability. Generally speaking, stable coatings generally can be obtained with actual acid numbers of from about 15 to about 110.

In the reaction mixture the ratio of epoxy resin to acid functional vinyl monomers can vary considerably, depending on the end-use. For example, as little as 1% to 99% acrylic can be used with satisfactory results. However, the epoxy is usually present in an excess amount and composes from 51 to 90% of the reaction mixture on a solids basis.

The reaction conditions of the radical polymerization process can vary considerably and are generally those which are conventional for such reactions. The initiator used in the vinyl polymerization can be any radical forming compound used for such purposes. Azobisisobutyro-nitrile, t-butyl per octoate, cumene hydroperoxide, benzoyl peroxide and many compounds of a similar nature are suitable for use as initiators herein. Initiators are commonly used in amounts ranging from about 2-7% based on the vinyl monomers. Use of an initiator in this amount should obtain good completion of from 99-100%. The choice and amount of initiator depends also on the reaction temperature which can be varied from 30° C. to 150° C. But in most practical reaction systems, the temperature is maintained at 70° C. to 130° C. The reaction can be run both in bulk and in solvnets, but at lower reaction temperature it is advantageous to use solvents to reduce the viscosity of the reaction medium. In addition, although stable and useful products can be obtained at temperatures above 120° C., a side reaction becomes more prevalent at temperatures much above 120° C. and the actual acid number is reduced, apparently due to ester formation of the carboxylic acid with the epoxy resin and solvent. It will, of course, be appreciated that the reaction mixture of step 2 comprises not only the desired grafted epoxy product of the present invnetion but also some unreacted epoxy resin and vinyl addition products.

The modified epoxy resin product of step 2 described hereinabove is made water dispersible by partial or complete neutralization of the carboxylic acid functional groups with a base, and with the addition of water provides an epoxy coating composition. Suitable bases for neutralizing the modified epoxy resins of this invention include organic bases, for example, sodium or potassium hydroxide, but for coating applications a fugitive base is preferred. Example of an acceptable fugitive base is dimethyl ethanolamine, but ammonia and mono, di and tri alkylamines and similar alkylamines can also be employed.

The pH of the aqueous coating composition will generally be from about 6 to about 10. The exact concentration of epoxy compound in the coating solution can vary over a wide range. For example, for dip coating a 2% solution might be desirable while for spray coating a 30% solution might be desirable. Of course, the epoxy compound can be in concentrate form or even in 100% solids form. Suitable concentrates for marketing the epoxy compound to end users might comprise, for example, from 70–90% of the epoxy. Of course, an aqueous coating composition of the present invention can comprise ingredients in addition to the neutralized stable epoxy compound of the present invention. Suitable optional ingredients include cross-linking agents, flow agents, wetting agents and the like. Examples of cross-linking agents include urea-formaldehyde, melamine-formaldehyde, and phenolic resins in an amount of from 5 to 45% based on total resin solids. The cross-linking agent can be added to the modified epoxy resin before the addition of water or if the cross-linking agent is water dispersible or a water emulsion, it can be added after the modified epoxy resin has been dispersed in water.

The following examples further illustrate the present invention.

EXAMPLE I

The following ingredients were added to a reaction vessel equipped with a mechanical stirrer, reflux condenser and temperature indicator:

| Ingredients | Parts by Weight |
|---|---|
| Epon 829 = | 272.3 |
| Bisphenol A = | 124.3 |
| 2,2,bis (4-hydroxy-2- = alkyl-phenyl) propane | 23.3 |
| Cymelphenol = | 30.7 |

The vessel was kept under an inert atmosphere of nitrogen. The contents were then heated to 177° C. and the mixture exothermed to 198° C. The mixture was then cooled to 180° C.±20° C. and held at that temperature for 90 minutes. Butyl cellosolve solvent was added and the temperature adjusted to 110° C. Four parts of t-butyl peroctoate catalyst, 30 parts of itaconic acid and 50 parts of styrene were added over a one hour period. Then 4 additional parts of t-butyl peroctoate catalyst were added over a 3 hour period and the reaction post-heated 2 additional hours. The reaction was cooled and bottled.

The reaction product had the following physical constants:
acid number=42.0
solids=70.6%.

To the reaction product was then added, with thorough mixing, 100 parts of 70.6% solids resin, 17.6 parts of Cymel 303 cross-linker and 4.7 parts of dimethylethanolamine. Then 171.9 parts of deionized water was added slowly. The resulting solution at pH 8.8 had a 16 sec. #4 Ford viscosity at 30% solids.

EXAMPLE II

The following ingredients were added to a reaction vessel equipped with a mechanical stirrer, reflux condenser and temperature indicator:

| Ingredients | Parts by Weight |
|---|---|
| Epon 829 = | 245.9 |
| Bisphenol A = | 139.5 |
| Proctor & Gamble Epoxide 8 = | 38.8 |
| 2.2-bis (4-Hydroxy- = allylphenyl) propane | 23.2 |

The reaction exothermed to 200° C. and was cooled to 177° C., and kept at that temperature for two hours. 215.1 parts of butyl cellosolve solvent were added and the temperature adjusted to 115° C. Then 30 parts itaconic acid, 3 parts of 70% t-butyl hydroperoxide, and 1 part 50% t-butyl peroctoate were added. Fifty parts of styrene were added over a one hour period. After all of the styrene had been added, 4 additional parts of 70% t-butyl hydroperoxide were added over a 3 hour period and reaction post-heated 2 hours. The reaction was bottled and cooled. The product was neutralized with dimethylethanolamine and was water dispersible and water stable.

What is claimed is:

1. The free radical reaction product of:
   an epoxy resin having at least two epoxy groups per molecule and having an organic unsaturated functional site; and
   an acid functional vinyl monomer, said epoxy resin and acid-functional monomer being reacted in amounts from 1% to 90% and 10% to 99%, respectively, and the resulting reaction product having an actual acid number of at least 15.

2. The product of claim 1 wherein said epoxy resin having an organic unsaturated functional site is the reaction product of:
   a lower molecular weight epoxy compound; and
   a multifunctional monomer having a functional moiety reactive with an oxirane moiety of said epoxy compound and a functional moiety comprising an organic unsaturated functional site.

3. The product of claim 2 wherein said epoxy resin is the reaction product of said lower molecular weight epoxy compound, said multifunctional monomer and, in addition, a diphenol compound.

4. The product of claim 3 wherein said lower molecular weight epoxy compound is an aliphatic diepoxide.

5. The product of claim 3 wherein said lower molecular weight epoxy compound is an aromatic diepoxide.

6. The product of claim 4 wherein said aliphatic diepoxide is selected from the group consisting of 1, 4-bis (2, 3 epoxypropoxy)butane, 4 (1, 2-epoxyethyl) 1, 2-epoxycyclohexane and mixtures thereof.

7. The product of claim 5 wherein said aromatic diepoxide is selected from the group consisting of glycidyl ether of 4,4$^1$ sec-butylidenediphenol, 4,4$^1$ isopropylidenediphenol and mixtures thereof.

8. The product of claim 2 wherein said multifunctional monomer is selected from the group consisting of 2,2-bis (4-hydroxy-3 allyphenyl) propane, epoxidized butadienes, and mono, di and tri methylol derivatives of allylphenols.

9. The product of claim 1 wherein said acid functional vinyl monomer is selected from the group consisting of itaconic acid, fumaric acid, acrylic acid, methacrylic acid, maleic acid, and mixtures thereof.

10. The product of claim 1 wherein said free radical reaction product includes, as a reactant, an additional vinyl monomer.

11. The free radical reaction product of:
    an epoxy resin having an organic unsaturated functional site, said epoxy resin being the reaction product of:
       a lower molecular weight epoxy compound selected from the group consisting of 1, 4-bis (2, 3 epoxypropoxy) butane 4 (1, 2-epoxyethyl) 1, 2-epoxycyclohexane, glycidyl ether of 4,4$^1$ sec-butylidenediphenol, 4,4$^1$ isopropylidenediphenol and mixtures thereof;
       a multifunctional monomer selected from the group consisting of 2,2-bis (4-hydroxy-3 allylphenyl) propane, epoxidized butadienes, and mono, di and tri methylol derivatives of allylphenols; and
    an acid functional vinyl monomer selected from the group consisting of itaconic acid, fumaric acid, acrylic acid, methacrylic acid, maleic acid, and mixtures thereof.

12. An aqueous composition comprising the water solubilized, free radical reaction product of claim 1.

13. The composition of claim 12 wherein said epoxy resin having an organic unsaturated functional site is the reaction product of:
    a lower molecular weight epoxy compound; and
    a multifunctional monomer having a functional moiety reactive with an oxirange moiety of said epoxy compound and a functional moiety comprising an organic unsaturated functional site.

14. The composition of claim 13 wherein said epoxy resin is the reaction product of said lower molecular weight epoxy compound, said multifunctional monomer, and, in addition, a diphenol compound.

15. The composition of claim 13 wherein said lower molecular weight epoxy compound is an aliphatic epoxide.

16. The composition of claim 13 wherein said lower molecular weight compound is an aromatic diepoxide.

17. The composition of claim 15 wherein said aliphatic epoxide is selected from the group consisting of 1, 4-bis (2, 3 epoxypropoxy) butane, 4 (1, 2-epoxyethyl) 1, 2-epoxycyclohexane and mixtures thereof.

18. The composition of claim 16 wherein said aromatic diepoxide is selected from the group consisting of glycidyl ether of 4,4$^1$ sec-butylidenediphenol, 4,4$^1$ isopropylidenediphenol and mixtures thereof.

19. The composition of claim 13 wherein said multifunctional monomer is selected from the group consisting of 2,2-bis (4-hydroxy-3 allylphenyl) propane, epoxidized butadienes, and mono, di and tri methylol derivatives of allylphenols.

20. The composition of claim 12 wherein said acid functional vinyl monomer is selected from the group consisting of itaconic acid, fumaric acid, acrylic acid, methacrylic acid, maleic acid, and mixtures thereof.

21. The process of making an aqueous based coating composition comprising the steps of:
providing an epoxy resin backbone having at least two epoxy groups per molecule and having an organic unsaturated functional site;
grafting an acid functional vinyl monomer onto said epoxy resin backbone in a free radical initiated chain reaction;
said epoxy resin and acid functional monomer being reacted in amounts from 1% to 90% and 10% to 99%, respectively, and the resulting reaction product having an actual acid number of at least 15, and neutralizing the acidic moieties of said acid functional vinyl monomer.

22. The process of claim 21 wherein said epoxy resin backbone is made by reacting:
a low molecular weight epoxy compound; and
a multi-functional monomer having a functional moiety reactive with an oxirane moiety of said low molecular weight epoxy compound and a functional moiety comprising an organic unsaturated functional site.

23. The process of claim 22 wherein said epoxy resin backbone is made by reacting said low molecular weight epoxy compound, said multi-functional monomer and, in addition, a diphenol compound.

24. The process of claim 22 wherein said lower molecular weight epoxy compound is an aliphatic diepoxide.

25. The process of claim 22 wherein said lower molecular weight compound is an aromatic diepoxide.

26. The process of claim 24 wherein said aliphatic diepoxide is selected from the group consisting of 1, 4-bis (2, 3 epoxypropoxy) butane, 4 (1, 2-epoxyethyl) 1, 2-epoxycyclohexane and mixtures thereof.

27. The process of claim 25 wherein said aromatic diepoxide is selected from the group consisting of glycidyl ether of 4,4$^1$ sec-butylidenediphenol, 4,4$^1$ isopropylidenediphenol and mixtures thereof.

28. The process of making an aqueous based coating composition comprising the steps of
providing an epoxy resin backbone having an organic unsaturated functional site by reacting:
an epoxy compound selected from the group consisting of 1, 4-bis (2, 3 epoxypropoxy) butane, 4 (1, 2-epoxyethyl) 1, 2-epoxycyclohexane, glycidyl ether of 4,4$^1$ sec-butylidenediphenol, 4,4$^1$ isopropylidenediphenol and mixtures thereof;
a multifunctional monomer selected from the group consisting of 2,2-bis (4-hydroxy-3 allylphenyl) propane, epoxidized butadienes, and mono, di and tri methylol derivatives of allylphenols; and
a diphenol;
grafting an acid functional vinyl monomer onto said epoxy resin backbone in a free radical initiated chain reaction, said acid functional vinyl monomer being selected from the group consisting of itaconic acid, fumaric acid, acrylic acid, methacrylic acid, maleic acid, and mixtures thereof; and
neutralizing the acidic moieties of said acid functional vinyl monomer.

29. The process of claim 21 wherein said multifunctional monomer is selected from the group consisting of 2,2-bis (4-hydroxy-3 allylphenyl) propane, epoxidized butadienes, and mono, di and tri methylol derivatives of allylphenols.

30. The process of claim 21 wherein said acid functional vinyl monomer is selected from the group consisting of itaconic acid, fumaric acid, acrylic acid, methacrylic acid, malic acid and mixtures thereof.

31. An aqueous composition comprising the water solubilized, free radical reaction product of:
an epoxy resin having an organic unsaturated functional site, said epoxy resin being the reaction product of:
a lower molecular weight epoxy compound selected from the group consisting of 1, 4-bis (2, 3 epoxypropoxy) butane 4 (1, 2-epoxyethyl) 1, 2-epoxycyclohexane, glycidyl ether of 4,4$^1$ sec-butylidenediphenol, 4,4$^1$ isopropylidenediphenol and mixtures thereof;
a multifunctional monomer selected from the group consisting of 2,2-bis (4-hydroxy-3 allylphenyl) propane, epoxidized butadienes, and mono, di and tri methylol derivatives of allylphenols; and
an acid functional vinyl monomer selected from the group consisting of itaconic acid, fumaric acid, acrylic acid, methacrylic acid, maleic acid, and mixtures thereof.

* * * * *

UNITED STATES PATENT AND TRADEMARK OFFICE
CERTIFICATE OF CORRECTION

PATENT NO. : 4,532,309
DATED : July 30, 1985
INVENTOR(S) : Andreas Lindert

It is certified that error appears in the above-identified patent and that said Letters Patent are hereby corrected as shown below:

| | |
|---|---|
| At column 1, line 56 | the first word --the-- should be "then" |
| At column 2, line 29 | the word --epon-- should be "Epon" |
| At column 2, lines 62,63 | the word --components-- should be "component" |
| At column 3, line 36 | the word --monomes-- should be "monomers" |
| At column 3, line 39 | the word --durin-- should be "during" |
| At column 3, line 62 | the word "epoxy" should be inserted after "1%" |
| At column 4, line 16 | the word --solvnets-- should be "solvents" |
| At column 4, line 27 | the word --invnetion-- should be "invention" |
| At column 4, line 54 | the word "optional" should be inserted after "comprise" |

Signed and Sealed this

Twenty-fourth Day of February, 1987

Attest:

DONALD J. QUIGG

Attesting Officer          Commissioner of Patents and Trademarks